(12) United States Patent
Stefanich

(10) Patent No.: US 12,095,919 B2
(45) Date of Patent: Sep. 17, 2024

(54) DYNAMIC DATA COMPLIANCE CONTROLS AT THE HIGHEST DIRECTIVES AND STANDARDS APPLICABLE WITH A NET-SUM FORMULA AS A ZERO-KNOWLEDGE PROOF COMPLIANCE VALIDATION KEY

(71) Applicant: Rymedi, Inc., Greenville, SC (US)

(72) Inventor: David Stefanich, Greer, SC (US)

(73) Assignee: Rymedi, Inc., Greenville, SC (US)

( * ) Notice: Subject to any disclaimer, the term of this patent is extended or adjusted under 35 U.S.C. 154(b) by 99 days.

(21) Appl. No.: 17/534,714

(22) Filed: Nov. 24, 2021

(65) Prior Publication Data

US 2022/0166625 A1   May 26, 2022

Related U.S. Application Data

(60) Provisional application No. 63/117,661, filed on Nov. 24, 2020.

(51) Int. Cl.
   *H04L 9/32* (2006.01)
(52) U.S. Cl.
   CPC .................................. *H04L 9/3221* (2013.01)
(58) Field of Classification Search
   CPC ....... H04L 9/3221; H04L 9/50; H04L 9/3218; H04L 63/20; H04L 2209/88
   See application file for complete search history.

(56) References Cited

U.S. PATENT DOCUMENTS

| | | | |
|---|---|---|---|
| 9,576,147 B1 * | 2/2017 | McClintock | H04L 63/10 |
| 9,794,289 B1 * | 10/2017 | Banerjee | H04L 63/205 |
| 10,404,757 B1 * | 9/2019 | Horton | H04L 67/02 |
| 11,336,461 B2 * | 5/2022 | Maunier | H04W 4/70 |
| 2006/0004847 A1 * | 1/2006 | Claudatos | G06F 16/125 |

(Continued)

FOREIGN PATENT DOCUMENTS

WO    WO-2020252050 A1 * 12/2020    ........... G06F 21/602

OTHER PUBLICATIONS

L. Ding and M. Ben Salem, "A Novel Architecture for Automatic Document Classification for Effective Security in Edge Computing Environments," 2018 IEEE/ACM Symposium on Edge Computing (SEC), Seattle, WA, USA, 2018, pp. 416-420, doi: 10.1109/SEC.2018.00056. (Year: 2018).*

*Primary Examiner* — Michael Simitoski
(74) *Attorney, Agent, or Firm* — Maynard Nexsen PC; Bryan L. Baysinger; Thomas R. Parker

(57) ABSTRACT

A software mechanism for controlling data use in compliance with applicable legal standards and directives via a symbolic instruction set that additionally creates a mathematical net-sum to provide a data compliance validation key for use of that data in software, firmware and hardware. In some embodiments, the software mechanism identifies and tags via a symbolic instruction set the standards and directives applicable to data elements as a result of laws, technical and industry standards, contractual obligations, and other sources of norms, in order to streamline data compliance in forthcoming uses of that data. In other embodiments, a symbolic instruction set creates compliance-validation keys utilizing a net-sum method across applicable data norms to provide cryptographic zero-knowledge proof of the compliance of such data for software, firmware and hardware uses.

10 Claims, 5 Drawing Sheets

(56) References Cited

U.S. PATENT DOCUMENTS

| | | | |
|---|---|---|---|
| 2008/0184329 A1* | 7/2008 | Cross | G06F 21/6218 726/1 |
| 2009/0254971 A1* | 10/2009 | Herz | G06Q 10/10 726/1 |
| 2011/0145593 A1* | 6/2011 | Auradkar | H04L 9/0643 713/189 |
| 2014/0380404 A1* | 12/2014 | Raj | G06F 21/6218 726/1 |
| 2015/0187353 A1* | 7/2015 | Yan | G06F 16/248 704/257 |
| 2016/0359915 A1* | 12/2016 | Gupta | H04L 43/04 |
| 2017/0364302 A1* | 12/2017 | Atherton | G06F 3/0649 |
| 2018/0241813 A1* | 8/2018 | Funk | G06F 9/546 |
| 2019/0207981 A1* | 7/2019 | Sweeney | H04L 41/145 |
| 2019/0268340 A1* | 8/2019 | Decouteau | H04L 63/105 |
| 2020/0210613 A1* | 7/2020 | Carrier | G06F 16/14 |
| 2020/0296102 A1* | 9/2020 | Buchner | H04L 63/0884 |
| 2020/0364605 A1* | 11/2020 | Gorham | G06F 40/216 |
| 2021/0034264 A1* | 2/2021 | Ali | G06F 3/062 |
| 2021/0083843 A1* | 3/2021 | Salomon | H04L 9/0819 |
| 2021/0133350 A1* | 5/2021 | Kirti | G06F 21/6245 |
| 2021/0344485 A1* | 11/2021 | Levin | H04L 9/0825 |
| 2021/0357392 A1* | 11/2021 | Bulut | G06Q 50/26 |
| 2023/0048167 A1* | 2/2023 | Gai | G06F 21/16 |

\* cited by examiner

DYNAMIC DATA COMPLIANCE CONTROLS AT THE HIGHEST DIRECTIVES AND STANDARDS APPLICABLE WITH A NET-SUM FORMULA AS A ZERO-KNOWLEDGE PROOF COMPLIANCE VALIDATION KEY

TECHNICAL FIELD

The present disclosure is directed, in general, to a software mechanism for controlling data use in compliance with applicable legal standards and directives via a symbolic instruction set that additionally creates a mathematical net-sum to provide a data compliance validation key for use of that data in software, firmware and hardware.

BACKGROUND

Today's information and data governance is applied in a linear fashion. Compliance mechanisms derived from standards and directives applicable to data use cases are applied to data transport, persistence and sharing. The current paradigm for technology-aided data compliance is based on treating data as a static object or element in time. In emerging information societies and their panoply of data use cases, data have different states as a result of changing relations to other data, contexts of use, and pre-existing web of rights and permissions, even though the same data element is being referenced. Each state provides a governance lens reflecting how entities approach the data use case.

Therefore, a need exists for the capability to represent dynamic governance compliance as a symbolic instruction set that can be applied to objects and object modifiers to streamline a wide variety of data uses requiring compliance for use case effectiveness. A further need exists for a zero-knowledge proof compliance validation key to streamline an even wider variety of data uses where mere reliable assurance of compliance is all that is required.

SUMMARY

Embodiments of the present invention address and overcome one or more of the above shortcomings and drawbacks, by providing methods, systems, and apparatuses related to dynamic data compliance controls at the highest directives and standards applicable with a net-sum formula as a zero-knowledge proof compliance validation key.

In some embodiments, a software mechanism identifies and tags via a symbolic instruction set the standards and directives applicable to data elements as a result of laws, technical and industry standards, contractual obligations, and other sources of norms, in order to streamline data compliance in forthcoming uses of that data.

In other embodiments, a symbolic instruction set creates compliance-validation keys utilizing a net-sum method across applicable data norms to provide cryptographic zero-knowledge proof of the compliance of such data for software, firmware and hardware uses.

Additional features and advantages of the invention will be made apparent from the following detailed description of illustrative embodiments that proceeds with reference to the accompanying drawings.

BRIEF DESCRIPTION OF THE DRAWINGS

The foregoing and other aspects of the present disclosure are best understood from the following detailed description when read in connection with the accompanying drawings. For the purpose of illustrating the invention, there are shown in the drawings embodiments that are presently preferred, it being understood, however, that the invention is not limited to the specific instrumentalities disclosed. Included in the drawings are the following Figures.

DETAILED DESCRIPTION

Systems, methods, and apparatuses are described herein which relate generally to a dynamic data compliance controls at the highest directives and standards applicable with a net-sum formula as a zero-knowledge proof compliance validation key. In the following description, for purposes of explanation, numerous specific details are set forth in order to provide a thorough understanding of the present invention. It will be evident, however, to one skilled in the art that the present invention may be practiced without these specific details and/or with any combination of these details.

The present disclosure is to be considered as an exemplification of embodiments of the present invention, and is not intended to limit the invention to the specific embodiments illustrated by the figures or description below. In describing the invention, it will be understood that a number of techniques and steps are disclosed. Each of these has individual benefit and each can also be used in conjunction with one or more, or in some cases all, of the other disclosed techniques. Accordingly, for the sake of clarity, this description will refrain from repeating every possible combination of the individual steps in an unnecessary fashion. Nevertheless, the specification and claims should be read with the understanding that such combinations are entirely within the scope of the invention and the claims.

Figure 1:
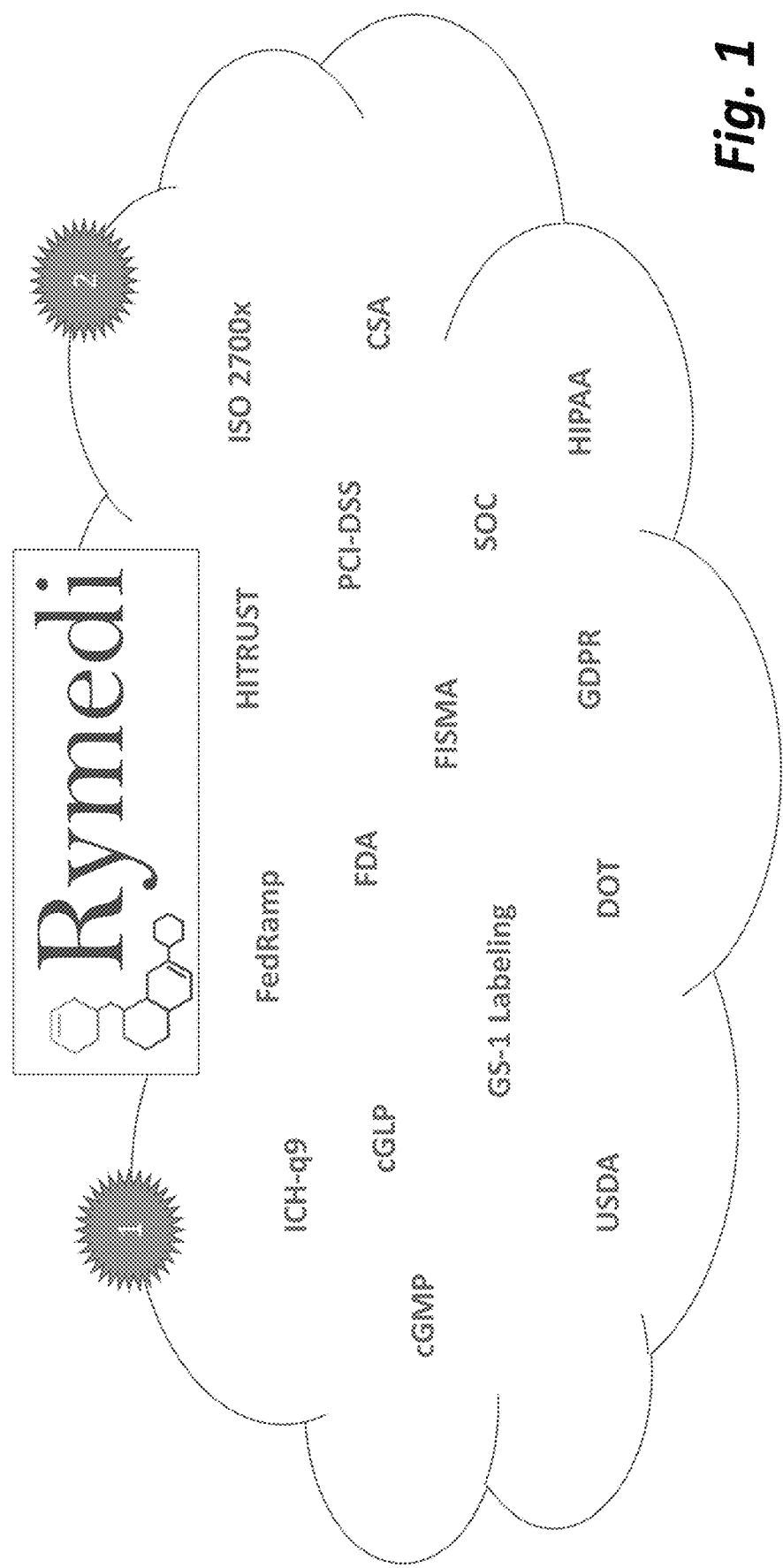
FIG. 1 depicts an example non-exhaustive list of standards and directives applicable to concerned data elements.

FIG. 1 depicts an example non-exhaustive list of standards and directives applicable to concerned data elements on which the compliance functions described are performed (the "standards and directives"). Data elements are discreet units, and combinations of units, of symbolic representations that constitute part of a computational process for information detection, storage, transfer, analysis, and reporting, among other computational purposes. The symbolic representations include but are not exclusive to electronic forms insofar as computational processes may include symbolic representation in physical ink media labels, chemical sensors, sound, light, heat, biological material patterns, and other non-electronic means of symbolic representation. In the example of FIG. 1, these standards and directives include Current Good Manufacturing Practice ("cGMP"); International Conference on Harmonisation of Technical Requirements for Registration of Pharmaceuticals for Human Use ("ICH") guideline Q9 ("ICH-q9"); Federal Risk and Authorization Management Program ("FedRamp"), Current Good Laboratory Practices ("cGLP"); Global Standards One ("GS-1") Labelling; U.S. Department of Transportation ("DOT"); U.S. Food and Drug Administration ("FDA"); Health Information Trust Alliance ("HITRUST"); Federal Information Security Management Act ("FISMA"); System and Organization Controls ("SOC"); General Data Protection Regulation (EU) 2016/679 ("GDPR"); Payment Card Industry Data Security Standard ("PCI-DSS"); Health Insurance Portability and Accountability Act ("HIPPA"); International Organization for Standardization ("ISO") 2700x standards; and Canadian Standards Association ("CSA").

Figure 2:
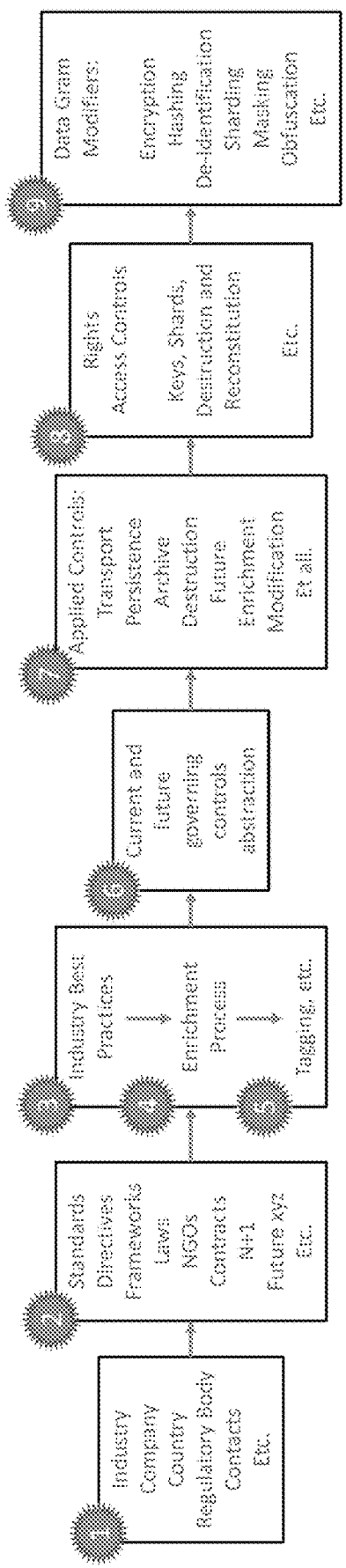
FIG. 2 illustrates an example method for providing dynamic data compliance controls, according to some embodiments.

FIG. 2 illustrates an example method for providing dynamic data compliance controls (the "compliance control steps"), according to some embodiments. This example begins at step 1 by locating a data element jurisdictionally 1. In this context, the term "data element" means discreet units, and combinations of units, of symbolic representations that constitute part of a computational process for information detection, storage, transfer, analysis, and reporting, among other computational purposes. The symbolic representations include but are not exclusive to electronic forms insofar as computational processes may include symbolic representation in physical ink media labels, chemical sensors, sound, light, heat, biological material patterns, and other non-electronic means of symbolic representation. Step 1 identifies applicable jurisdictions governing the data element based on static properties immediately apparent with the input of the data element, such as data element source, data element origin, data storage location, associated industry, tagged contractual obligations such as licensing, and other criteria. The term "jurisdiction" refers to a particular set of governing norms that apply to the data elements as a result of data element source, format, medium, origins, storage and transmission locations, industry usage, computational function purpose, contractual obligations, and other criteria that may make such governing norms applicable with some consequence for the users, owners, third party conduits, and other entities having a relationship to the data element deemed relevant to that set of governing norms. Such sets of governing norms include, for example, statutory law, regulations, industry standards, technical standards, international treaty, contract, and other sources of norm generation and enforcement. Jurisdiction identification is performed by computational interpretation of information linked to a data element as well as supplemental information external to the data element-linked information that may be detected or reported at the current state in addition to that linked information detected or reported at prior states. Computational interpretation includes but is not limited to rules-based and machine learning methods for linking, detecting and reporting information relevant to jurisdiction identification.

Continuing with reference to FIG. 2, step 2 breaks down applicable standards and directives for the data element. This step identifies which aspects of standards and directives are applicable to a data element based on dynamic properties of the data element, such as past and future uses of the data, entities having rights to that data element, legal status of said entities pertaining to legal standing (proper incorporation, age, mental soundness, etc.), statutory and contractual law, governmental agency regulation, private association standards, certifications, and other criteria. This identification is performed by computational processes including but not limited to rules-based and machine learning methods so that the dynamic properties of the data element determine the specific standards and directives of the applicable jurisdictions that apply.

Step 3 of the method shown in FIG. 2 operationalizes industry best practices for control points and policy enforcement of the standards and directives identified in step 2. This operationalization attaches data element use and access controls according to best practice mechanisms of compliance by industry and applicable governing jurisdictions, including but not limited to security parameters, policy enforcement points and other kinds of controls. Step 3 is performed by computational means of implementing controls and policy compliance that include but are not limited to data access controls, multi-factor authentication, writing data to specified kinds of files in particular formats, utilizing specific encryption methods, linking but storing separately distinct yet related data elements, reporting specified kinds of data use to particular parties, etc.

During step 4 of FIG. 2 a data element enrichment process is executed to add relevant relational and contextual information. Relational information pertains to networks of data with which the specific data element has been associated, such as having an origin with an assemblage of particular sensors owned by a specific entity in a defined period of time, or networks of data in which that data element has been used for particular analytic queries made by a specific entity. Contextual information is additional information about the relational networks of the data element that may provide meaningful signals about the data element origins, use, attached rights and liabilities, and other governing principles, such as impinging data or asset claims on a relationally identified entity, sector-specific board approvals or audits, weather, anomalous events, and other information that may be relevant to data element governance. The data element enrichment process is performed by computational means including but not limited to rules-based and machine learning methods searching public and private sources of relevant information and performing analytical inferences of relevant relational or contextual value based on specified criteria or the generation of specific criteria following governing principles.

Step 5 of the method illustrated in the FIG. 2 provides a dynamic tagging of the data element such that a publicly viewable baseline metadata description of the data element with multiple metadata tags changes into a tailored private metadata description based on the keys and properties of the entity reviewing the multiple metadata tags. The data element tags will change based on external factors such as demographics, target audience, contracts, customer profiling and other features associated with cryptographic keys executed by a reviewing entity and/or disclosed properties of the reviewing entity, which may include summaries, models, and other kinds of representations of reviewer relational and contextual properties in order to present data element tags that increase the likelihood of relevance of the data element for the reviewer, as well as pointing to metadata tags of other data elements that would further enrich both/either the reviewed data element and/or queries and purposes of the reviewing entity. Some embodiments of the method use a metadata lake query architecture and varieties of artificial intelligence, machine learning and other analytics methods, as well as other architectures and methods of achieving the same dynamic tagging described above.

Step 6 of the method illustrated in FIG. 2 creates an abstraction of the relevant governing constraints. First, the method identifies which operationalized standards and directives are applicable to the specific data element given relational and contextual information available. Then it differentiates between static standards and directives and those that are changeable by an authorized entity. Then it identifies which entities are allowed to change those governing rules that are changeable. It also identifies the entity that has residual rights and liabilities not covered by those assigned elsewhere by statute, contract or industry standard practice.

Step 6 also operationalizes the management of conflicts between governing directives. In some embodiments, default data use executions (or software functions that are automatically triggered by preset data use criteria) are provided that include "stop" commands or default commands in a particular direction that are modifiable with authorized orders, such as court injunctions. For example, an entity's exercise of the "right to be forgotten" via a key enabling data deletion can be reversed with regeneration of said key under legal orders in order to reconstitute deleted data. In some embodiments, dispute settlement automation is performed as part of step 6 during the management conflicts between governing directives. Additionally, in some embodiments, step 6 attaches tags indicating governance of future data generation, models and other intellectual property derived from the covered data element.

An example of a symbolic instruction set combining compliance control steps 1-6 would be:
+Enc256+Hash+Trans-DeIdentified+2MFA+W3CDID-PII-GeoLock-MutilReg-Time+4e3+1H+ID4-Geo
The instruction set combining compliance control steps 1-6 provides the rule basis for subsequent steps applying controls on actual data use.

Step 7 of FIG. 2 applies the controls identified in the preceding steps to actions over the data element. For example, these controls may limit certain territories or entities for data transport or storage, data element availability may only be permitted for a set period of time, certain archiving requirements may apply, only certain forms of data enrichment or use may be authorized for the future, and many other limitations imposed by the governing standards and directives can be applied as controls at this step. Then, step 8 manages access controls according to the operationalized standards and directives via key management techniques. Access keys are generated according to the standards and directives. Varieties of key management techniques equip potential users of the data elements with the appropriate access keys such that data access and use is only possible for that entity in the ways authorized by the governing norms applied to the relevant data elements. Different entities accessing and using the data may have very different kinds of permissions, ranging from very narrow, time-sensitive, industry specific, tightly monitored uses, to very permissive uses with few limitations. Access key management techniques will follow the state of the art.

Finally, step 9 of FIG. 2 modifies the data element in order to execute an operation utilizing said data element in accordance with operationalized standards and directives, generating a functional output of the entire invention as an input into any data using process. For example, a data element concerning medical research on a rare cancer patient may be modified to streamline its use as an input to oncology clinical trial analysis according to governing laws and the patient's consents motivated by desires to both contribute to medical innovations and enhance affordable access to medical innovations. The patient may have consented to deidentified data sharing for oncology R&D, which could include varieties of Big Data analytics to streamline trial design and learnings, as well as construct synthetic placebo control arms for research analysis but not regulatory submission insofar as the deidentified data would not itself be evaluated as contributing to a regulator admissible control arm. However, the patient consents to personally identifiable use of their data for R&D and regulatory submissions if an accessing company is certified as committing to one of several global access models for their commercialized oncology treatments. The resulting data element modification performed at step 9 would enable all oncology clinical trial analyses to have access to the permissioned data in deidentified form. However, those entities conducting clinical trial analyses that have certified their commitments to one of several recognized global affordable access models would have access to personal information of the patient as well, and pre-authorization for use of that medical data and personal information in any regulatory submissions.

Data users may pay to consume that output or access via other authorized ways. For example, data users who are not barred by the aforementioned compliance automation from accessing data may be able to participate in various commercial transactions to secure data access with varieties of potential limitations. Commercial transactions may include but not be limited to use volume payments, microtransactions per data element, subscriptions for volume and/or kind and/or time period of access, cross-licensing and other kinds of in-kind exchange, risk and/or revenue sharing agreements, membership in a consortium authorized for access, and other kinds of commercial transaction. Payment amounts and terms may vary based on varieties of data limitations unlocked by the payment, including but not limited to time periods of access, digital rights management restrictions on data uses, liability allocations, rights to derivative works based in whole or in part on that data, and other terms that may enhance or diminish the value of the data elements accessed for payment or other kinds of formal authorization.

In some embodiments, derivative data elements from the functional output of the process go through the entire data control process as well. These derivative data elements are data elements generated by the aforementioned computational process itself. These data elements may themselves go through the dynamic data governance compliance automation process described in order to enhance data governance compliance applied to those very derivative data elements themselves.

Figure 3:
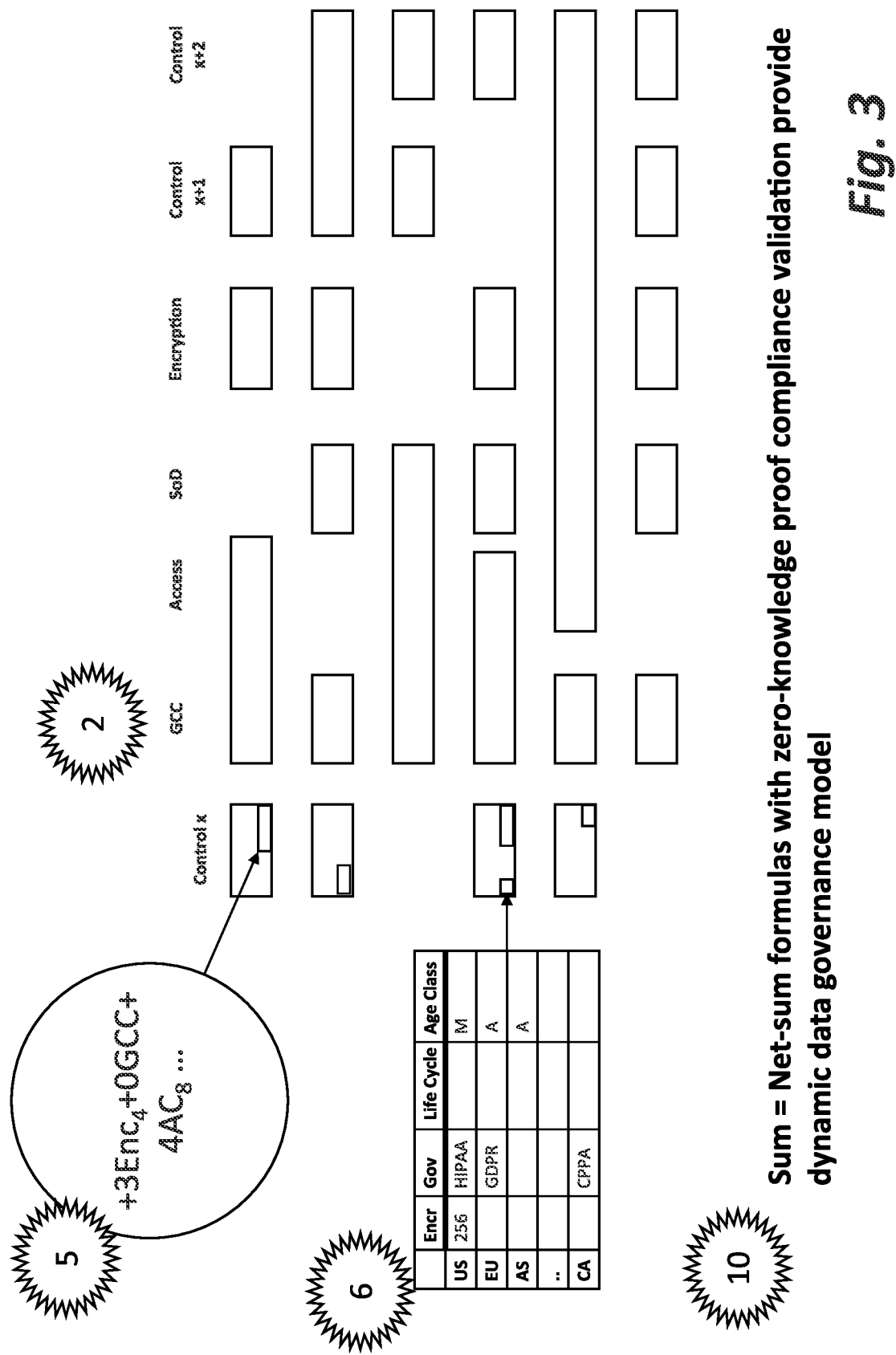
FIG. 3 illustrates how those compliance control steps may be represented by a net sum formula to provide a zero-knowledge proof compliance validation key.

FIG. 3 illustrates how those compliance control steps may be represented by a net sum formula to provide a zero-knowledge proof compliance validation key. Such a zero-knowledge proof compliance validation key is useful in assuring data compliance for a separate software, firmware or hardware function, without requiring full performance of the compliance analysis nor disclosure of elements of that analysis. Substituting the zero-knowledge proof compliance validation key for full performance of the compliance analysis will enhance performance, throughput, storage and other functions involving the relevant data element compliance. Additionally, zero-knowledge proof compliance validation keys facilitate a wider variety of data sources and kinds being made available for compliance validation than would be the case if the compliance analysis itself had to be disclosed due to varieties of privacy, intellectual property, liability and other concerns. Compliance control step 10, illustrated in FIG. 3, provides a symbolic instruction set to achieve a mathematical net-sum representation of data element compliance with applicable standards and directives, in order to provide a zero-knowledge proof validation key for use of that compliant data element in software, firmware or hardware. Numbers in FIG. 3 refer to numbered steps in FIG. 2.

As an example use case of the techniques described herein, agricultural data elements required for a food growing farm to comply with USDA and FDA standards and directives may be generated as part of an integrated network of Internet of Things ("IoT") sensors across a farming cooperative. The farmer owning the sensor has severe Alzheimer's and so a son has guardianship over his estate, while the farmer cooperative has some overlapping rights to the sensor data. Meanwhile the farm itself has been foreclosed on by a bank claiming a lien on farm assets which arguably may include the data elements at issue. Those data elements are at issue because of a pending insurance dispute over purportedly anomalous weather events on the farm and upstream from the farm watershed, which are material to determining whether the farmer and owner of the data elements at issue met his obligations to maintain an emergency irrigation system or not in the insurance dispute. Who gets to use those data elements, for what, and for how long is managed by the methods discussed herein.

In this case, step 1-4 utilize information intrinsic to the farming sensor data, information linked to that data, and information sourced according to herein described enrichment processes. Step 1 identifies jurisdictions including but not limited to USDA., U.S. FDA, ISO, U.S. federal law, the home state, the farming cooperative corporate agreements, relevant identifiable related contracts, and relevant data and communication standards. Step 2 determines applicable standards and directives given data element features to include but not be limited to USDA guidelines for cGACP, FDA guidelines for cGMP, applicable ISO standards for agricultural and food processing practices and purposes of the sensor data, federal and state regulations and guidelines applicable to guardianship related to mental capacity and foreclosure rules, and farming cooperative rules on rights and liabilities concerning the sensor network data. Step 3 identifies industry best practices for data use, rights and liabilities with respect to the applicable standards and directives. Step 4 adds relational information about the network of sensors and uses of sensor data bundles that might be relevant, as well as contextual information about local weather patterns and sources of detailed information concerning specific local weather events. Step 5 tags the data element as described herein with dynamic tagging of the data element such that a publicly viewable baseline metadata description of the data element with multiple metadata tags changing into a tailored private metadata descriptions based on the keys and properties of the entity reviewing the multiple metadata tags. Step 6 creates an abstraction of the relevant governing constraints, including but not limited to standards and directives that are static and those that are changeable by an authorized entity, as well as residual rights and liabilities which here may apply to the son with guardianship over the farmer's estate, the bank holding a lien on farm assets, and the farming cooperative with the broader sensor network. Step 7 applies controls to the data element in accordance with step 6's abstraction of governing constraints, including but not limited to restrictions on access to and archiving of the data element, persistence limitations on data use permissions granted for the referenced legal dispute, transport limitations capable of override by court order. Step 8 further operationalizes the controls of step 7 for viability across technology systems and architectures via data packet protocols and key management; in this case, allocating limited access keys to dispute parties. Step 9 modifies the data element so as to operationalize all permissions and limitations as it functions as an input to execute computational operations. Step 10 performs the net sum formula described herein in order to provide a zero-knowledge proof compliance validation key for all parties concerned with the data element in the dispute and having rights and liabilities over the data element outside of the dispute that computational use of the data element has and remains compliant with the governing norms applicable to said data element.

Figure 4:
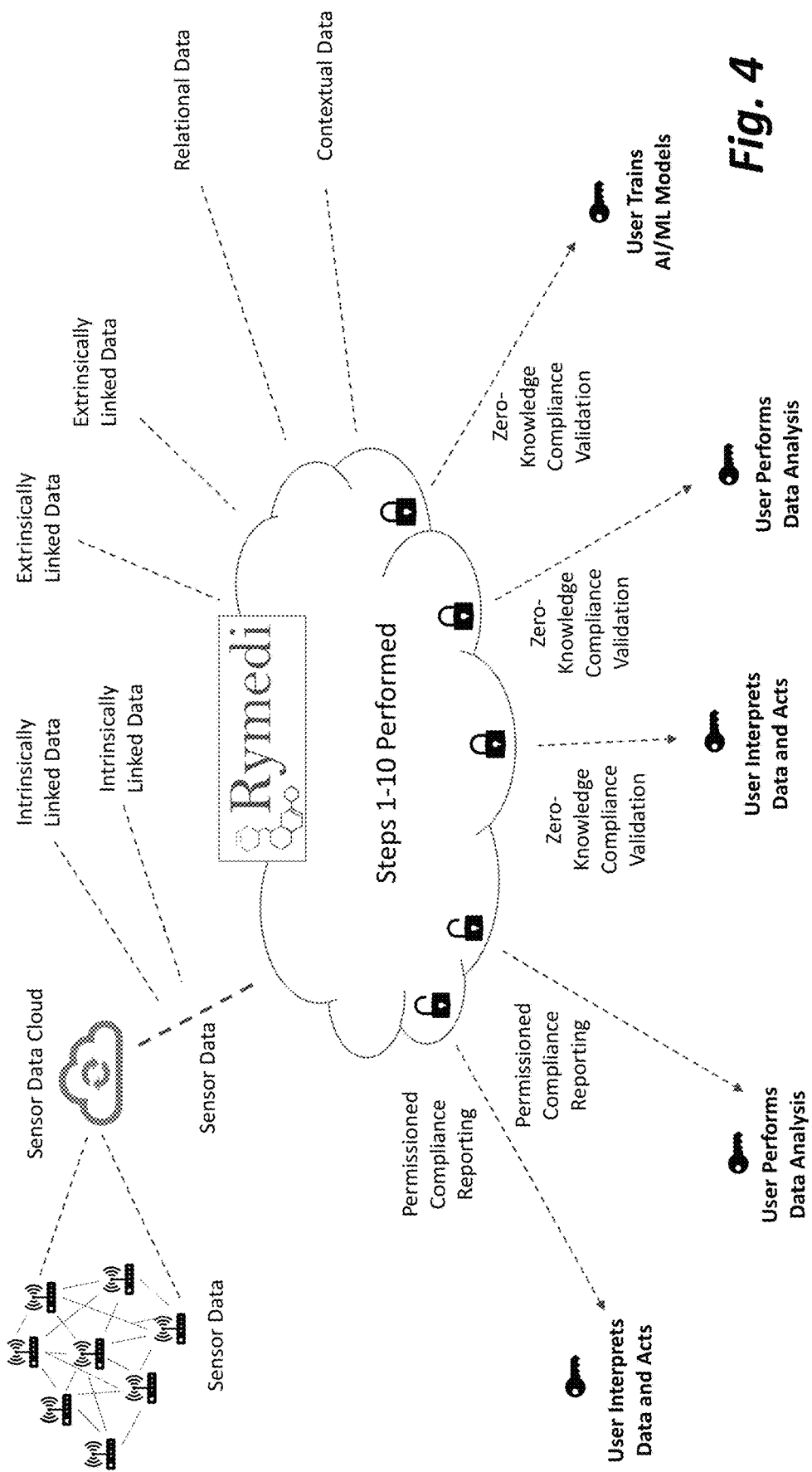
FIG. 4 illustrates a system view of data transmission between different computing systems to perform the techniques described herein for an agricultural sensor data example.

FIG. 4 provides a system view of how data may be transmitted between different computing systems to perform the techniques described herein for the agricultural sensor data example above.

Figure 5:
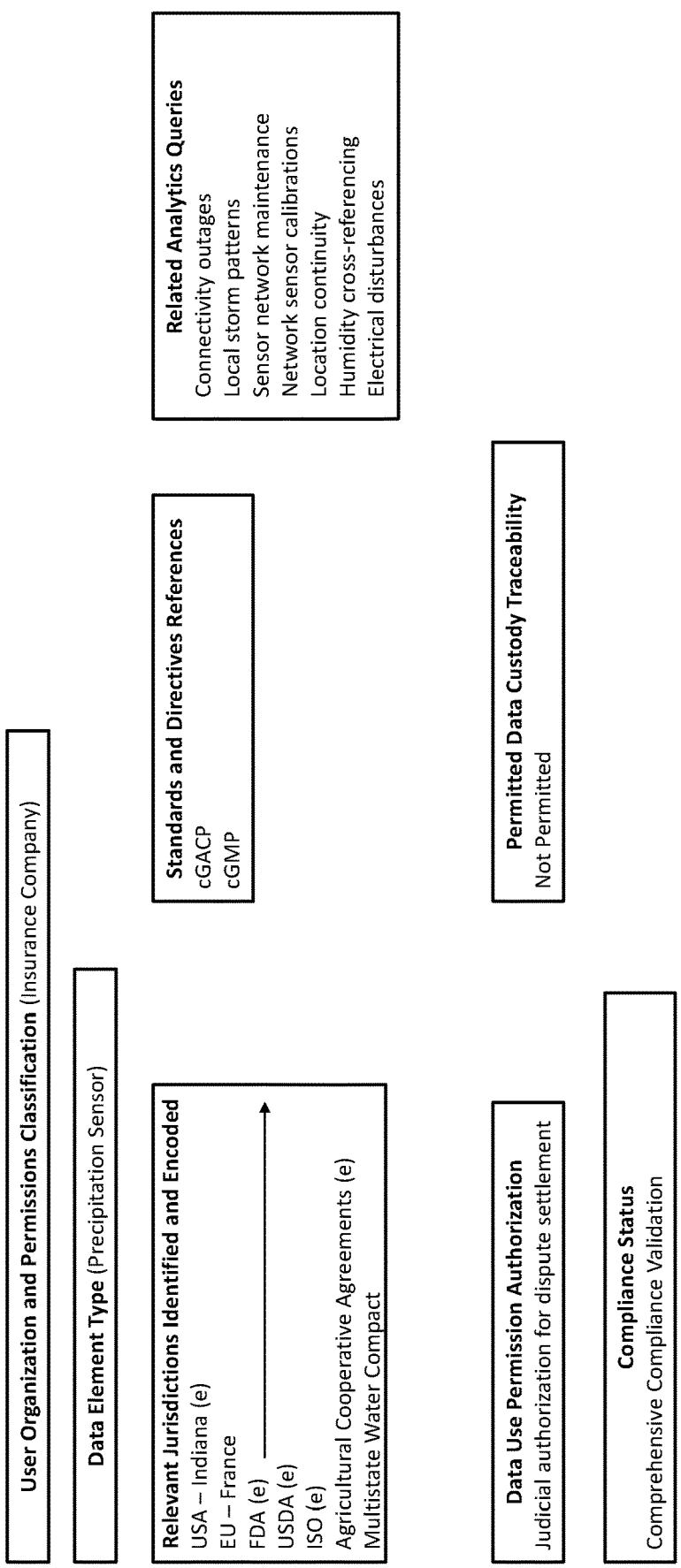
FIG. 5 shows an example graphical user interface illustrating how data may be presented, according to the techniques described herein for an agricultural sensor data example.

FIG. 5 shows an example graphical user interface illustrating how data may be presented, according to the techniques described herein for the agricultural sensor data example above.

Another example use case for the invention described herein concerns patient health care data elements compliant with HIPPA and IRB standards that are held within a research databank. The databank consists of data profiles to which both patients and the databank owner have overlapping rights. A patient is temporarily incapacitated as a result of a car accident so a next of kin has temporary guardianship over the patient's estate. The data elements within the databank are at issue because of a pending merger with a larger corporation and specific commercial value tied to consented data use of the incapacitated patient's data for clinical research on a rare disease. Rights management automation for computational uses of the data elements held by the resulting corporation are significantly enhanced determined by the invention discussed herein.

A further example use case for the invention described herein addresses patient health care data elements compliant with the UN Principles on Personal Data Protection, DOJ, GDPR, and HIPPA standards and directives that are held within a database. The owner of data elements in a data profile assigns all usage rights for the genetic data profile to their spouse. The data elements are at issue because legal authorities request a genetic profile from the database when the owner goes missing in order to use such information to make an unidentified person identification. Here again, the invention streamlines computational uses of the data elements and management of relevant rights and liabilities.

An additional example use case applies to healthcare data elements held in a privately owned databank which contains the profiles of deceased biological relatives. The databank owner experiences permanent incapacitation due to an automobile accident, so her daughter acts as the guardian of her estate once she turns 18. Since the daughter is not yet 18 years of age, the database is placed in a trust and a business associate acts as manager of the database until the inheritor is of legal age. The data elements right and liabilities become an issue because the manager has limited user rights over the database when public authorities identify that data as crucial to accelerating research and development to address an urgent epidemic crisis a part of a training machine learning analytics on biological dynamics that were rare prior the epidemic crisis, yet attributed to several of the deceased relatives. The invention described herein accelerates permissions management for time-sensitive access to data for machine learning training in order to meet the health urgency.

Another example use case applies to automating compliant reporting of patient health information to government agencies requiring reporting for specific public health purposes. In this case, the invention is applied in a digital workflow solution for diagnostic testing of infectious diseases that state and federal government agencies require healthcare providers and/or diagnostic laboratories to report test results and varying kinds of patient information to particular agencies, according to agency-specific standards. Relevant jurisdictional definition is identified by the system via GPS coordinates of test administration, home address registered for the patient, and location of the processing diagnostic laboratory. This identifies whether HIPAA or additional privacy protections under the California Consumer Privacy Act or other heightened state-specific standards apply to protected health information and personally identifiable information, and the operative consenting requirements by registered patient age, mental capacity, guardianship status, or other factors. Industry standards for patient privacy and cybersecurity controls such as HITRUST, ISO certifications, CMMC SOC Level 3, and CLIA laboratory audit standards determine and activate the data system and organizational access controls appropriate for compliant data management. A cryptographic key specific to these governing standards applied to the data element is generated, such that two other cryptographic keys are required to perform a system operation. In the process of acting upon the governmental reporting requirement, that data element is enriched with contextual population health statistical and other data per agency-specific standards, as well as converted into the required file format, those enriching aspects being encoded in a cryptographic key specific to that recipient and mode of data transport. A third cryptographic key with machine readable metadata defining the kind of data transaction is hashed onto a public permissionless blockchain for purposes of immutable auditability of data linked to that hash. Together, the three cryptographic keys execute the automated government reporting according to varying standards by agency and data governance jurisdiction, while additionally providing a net-sum formula that provides cryptographic zero-knowledge proof of compliance validation, concerning the source, management and use of that data, alongside compliant reporting in required forms and timing. Amidst the complexity of many kinds of organizations and professionals conducting diagnostic testing, and varying standards compliance as well as verifications of compliance, this means of automating compliant reporting also provides cryptographic assurance that appropriate action was taken for both government agencies seeking timely information for public health response, and patients wanting their privacy protected. The invention herein streamlines and enhances coordination of healthcare providers and diagnostic laboratories with public health agencies, improving the accuracy and reliability of reporting health information alongside public trust of the security of patient privacy.

The embodiments of the present disclosure may be implemented with any combination of hardware and software. For example, standard computing platforms (e.g., servers, desktop computer, etc.) may be specially configured to perform the techniques discussed herein. In addition, the embodiments of the present disclosure may be included in an article of manufacture (e.g., one or more computer program products) having, for example, computer-readable, non-transitory media. The media may have embodied therein computer readable program codes for providing and facilitating the mechanisms of the embodiments of the present disclosure. The article of manufacture can be included as part of a computer system or sold separately.

The terminology used herein is for the purpose of describing particular embodiments only and is not intended to be limiting of the invention. As used herein, the term "and/or" includes any and all combinations of one or more of the associated listed items. As used herein, the singular forms "a," "an," and "the" are intended to include the plural forms as well as the singular forms, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

Unless otherwise defined, all terms (including technical and scientific terms) used herein have the same meaning as commonly understood by one having ordinary skill in the art to which this invention belongs. It will be further understood that terms, such as those defined in commonly used dictionaries, should be interpreted as having a meaning that is consistent with their meaning in the context of the relevant art and the present disclosure and will not be interpreted in an idealized or overly formal sense unless expressly so defined herein.

Unless stated otherwise as apparent from the following discussion, it will be appreciated that terms such as "applying," "generating," "identifying," "determining," "processing," "computing," "selecting," or the like may refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices. Embodiments of the methods described herein may be implemented using computer software. If written in a programming language conforming to a recognized standard, sequences of instructions designed to implement the methods can be compiled for execution on a variety of hardware platforms and for interface to a variety of operating systems. In addition, embodiments of the present invention are not described with reference to any particular programming language. It will be appreciated that a variety of programming languages may be used to implement embodiments of the present invention.

An executable application, as used herein, comprises code or machine readable instructions for conditioning the processor to implement predetermined functions, such as those of an operating system, a context data acquisition system or other information processing system, for example, in response to user command or input. An executable procedure is a segment of code or machine readable instruction, sub-routine, or other distinct section of code or portion of an executable application for performing one or more particular processes. These processes may include receiving input data and/or parameters, performing operations on received input data and/or performing functions in response to received input parameters, and providing resulting output data and/or parameters.

A "graphical user interface" (GUI), as used herein, comprises one or more display images, generated by a display processor and enabling user interaction with a processor or other device and associated data acquisition and processing functions. The GUI also includes an executable procedure or executable application. The executable procedure or executable application conditions the display processor to generate signals representing the GUI display images. These signals are supplied to a display device which displays the image for viewing by the user. The processor, under control of an executable procedure or executable application, manipulates the GUI display images in response to signals received from the input devices. In this way, the user may interact with the display image using the input devices, enabling user interaction with the processor or other device.

The functions and process steps herein may be performed automatically or wholly or partially in response to user command. An activity (including a step) performed automatically is performed in response to one or more executable instructions or device operation without user direct initiation of the activity.

The system and processes of the figures are not exclusive. Other systems, processes and menus may be derived in accordance with the principles of the invention to accomplish the same objectives. Although this invention has been described with reference to particular embodiments, it is to be understood that the embodiments and variations shown and described herein are for illustration purposes only. Modifications to the current design may be implemented by those skilled in the art, without departing from the scope of the invention. As described herein, the various systems, subsystems, agents, managers and processes can be implemented using hardware components, software components, and/or combinations thereof. No claim element herein is to be construed under the provisions of 35 U.S.C. 112(f) the element is expressly recited using the phrase "means for" followed by a description of a performed function.

I claim:

1. A method for managing use of data in compliance with data protection standards, comprising:
   storing information about one or more data protection standards, wherein each of the one or more data protection standards is associated with a respective set of one or more static properties and a respective set of one or more access controls;
   receiving a first data element;
   analyzing the first data element to determine a first set of one or more static properties of the first data element;
   analyzing a second stored data element to determine if the second data element is relevant to the first data element;
   responsive to determining the second data element is relevant to the first data element, generating metadata associating the second data element with the first data element, wherein the metadata comprises a publically viewable baseline metadata description associating the second data element with the first data element and a private metadata description associating the second data element with the first data element that is viewable based on an access key;
   determining one or more governing data protection standards for the first data element using the determined first set of one or more static properties of the first data element and the stored information about the one or more data protection standards; and
   storing the first data element, wherein access to the stored first data element is managed according to the respective sets of access controls associated with the one or more determined governing data protection standards, and
   wherein the access to the stored first data element comprises determining the access key for one or more users to access the first data element, wherein the access key is distributed to the one or more users based on the first set of one or more static properties of the first data element.

2. The method of claim 1, wherein:
   the first data element is associated with a first set of one or more metadata tags;
   the second data element is associated with a second set of one or more metadata tags; and
   analyzing the second data element to determine if the second data element is relevant to the first data element comprises:
      analyzing the second set of one or more metadata tags to select one or more metadata tags from the second set of metadata tags, wherein the selected one or more metadata tags are relevant to the first data element; and
      adding one or more metadata tags to the first set of one or more metadata tags that point to the selected one or more metadata tags of the second set of one or more metadata tags.

3. The method of claim 2, wherein:
   at least one of the first set of one or more metadata tags indicates one of the first set of one or more static properties; and
   at least one of the second set of one or more metadata tags indicates one of a second set of one or more static properties of the second data element.

4. The method of claim 3, wherein the second set of one or more static properties comprises at least one of:
   data element source;
   data element origin;
   data element storage location;
   data element transmission location;
   data element format;
   data element medium;
   associated industry of use; and
   associated licensing obligations.

5. The method of claim 1, wherein the one or more data protection standards comprise at least one of:
   Current Good Manufacturing Practice ("cGMP") data protection standard;
   International Conference on Harmonization of Technical Requirements for Registration of Pharmaceuticals for Human Use ("ICH") guideline Q9 ("ICH-q9") data protection standard;
   Federal Risk and Authorization Management Program ("FedRamp"), Current Good Laboratory Practices ("cGLP") data protection standard;
   Global Standards One ("GS-1") Labelling data protection standard;
   Department of Transportation ("DOT") data protection standard;
   U.S. Food and Drug Administration ("FDA") data protection standard;
   Health Information Trust Alliance ("HITRUST") data protection standard;
   Federal Information Security Management Act ("FISMA") data protection standard;
   System and Organization Controls ("SOC") data protection standard;
   General Data Protection Regulation (EU) 2016/679 ("GDPR") data protection standard;
   Payment Card Industry Data Security Standard ("PCI-DSS") data protection standard;
   Health Insurance Portability and Accountability Act ("HIPAA") data protection standard;
   International Organization for Standardization ("ISO") 2700x data protection standard; and
   Canadian Standards Association ("CSA") data protection standard.

6. The method of claim 1, wherein the first set of one or more static properties comprises at least one of:
   data element source;

data element origin;
data element storage location;
data element transmission location;
data element format;
data element medium;
associated industry of use; and
associated licensing obligations.

7. The method of claim 1, wherein at least one of the respective sets of access controls associated with the one or more determined governing data protection standards comprises at least one of:
security parameters; and
policy enforcement points.

8. The method of claim 1, wherein storing the first data element comprises storing metadata associated with the first data element, wherein the metadata associated with the first data element comprises a description, wherein access to the stored first data element is managed according to the respective sets of access controls associated with the one or more determined governing data protection standards.

9. The method of claim 1, further comprising generating a private metadata description for the first data element, wherein an access to the private metadata description is based on the first set of one or more static properties of the first data element.

10. The method of claim 9, further comprising generating a public metadata description for the first data element distinct from the private metadata description, wherein the public metadata description is viewable by any user regardless of the first set of one or more static properties of the first data element.

* * * * *